United States Patent [19]

Satoh et al.

[11] 4,334,721
[45] Jun. 15, 1982

[54] BALL BEARING

[75] Inventors: Hisashi Satoh, Hiratsuka; Yukihiro Akabane, Tokyo; Yukio Shiraiwa, Yokohama; Shuyou Tsuchiya, Fujisawa, all of Japan

[73] Assignee: Nippon Seiko Kabushiki Kaisha, Tokyo, Japan

[21] Appl. No.: 170,717

[22] Filed: Jul. 21, 1980

[30] Foreign Application Priority Data

Aug. 23, 1979 [JP] Japan ................ 54-106603

[51] Int. Cl.³ .................. F16C 33/58; F16C 19/06
[52] U.S. Cl. ................................ 308/193; 308/188
[58] Field of Search ............... 308/193, 188, 189 R, 308/195, 197, 235

[56] References Cited

U.S. PATENT DOCUMENTS 3,370,899 2/1968 Eklund ........................ 308/193
3,751,123 8/1973 Parker ........................ 308/193
3,802,753 4/1974 Parker ........................ 308/188

Primary Examiner—Lenard A. Footland
Attorney, Agent, or Firm—Shapiro and Shapiro

[57] ABSTRACT

In a ball bearing including an outer race, an inner race and ball-like rolling members interposed between the two races, the outer race has a single arcuate orbit groove and when the orbit groove coefficient of the inner race is expressed as $$F = \frac{\frac{\rho_1}{D} - 0.5}{\frac{\rho_0}{D} - 0.5}$$

where $\rho_0$ is the curvature radius of the groove bottom of the orbit groove of the inner race, $\rho_1$ is the curvature radius of the groove edge of said orbit groove and D is the diameter of the rolling members, $10 \leq F \leq 70$.

2 Claims, 2 Drawing Figures

BALL BEARING

BACKGROUND OF THE INVENTION

1. Field of the Invention

This invention relates to a ball bearing, and more particularly to a ball bearing suited for a usage condition in which a high moment load is dominant and a rolling-contact fatigue life (flaking life, that is, life until generation of flaking) is required, for example, suited as the wheel bearing of the semi-float type rear axle of an automotive vehicle.

2. Description of the Prior Art

It has heretofore been proposed to make the bearing orbit non-circular so as to be capable of withstanding the high moment load of a bearing.

However, in the case of a bearing such as the wheel bearing of the semi-float type rear axle of an automotive vehicle in which the moment load condition is severe, the point of contact between rolling members (hereinafter referred to as the balls) and the orbit groove is moved to near the groove shoulder and part of the contact ellipse at the point of contact protrudes from the orbit groove (hereinafter referred to as the riding of the balls), thus causing a problem before the life of the bearing. When the riding of the balls occurs, streaks are created on the surface of the balls and obstructions such as noise and vibration arise.

SUMMARY OF THE INVENTION

It is the object of the present invention to provide a ball bearing in which the riding of balls is not liable to occur even under a severe moment load condition and which has a long flaking life.

The present invention achieves the above object by making the orbit groove of the outer race into a single arcuate orbit groove as shown in FIG. 1 of the accompanying drawings and providing the inner race with an orbit groove coefficient $$10 \leq F \leq 70$$

when the orbit groove coefficient is defined as $$F = \frac{\frac{\rho_1}{D} - 0.5}{\frac{\rho_0}{D} - 0.5}$$

where $\rho_0$ is the curvature radius of the groove bottom of the orbit groove of the inner race, $\rho_1$ is the curvature radius of the groove edge of said orbit groove and $D$ is the diameter of the balls.

Further, according to a particularly advantageous embodiment of the present invention, when the radius of the orbit groove of the outer race is R, $$R \geq 0.52D.$$

The invention will become fully apparent from the following detailed description thereof taken in conjunction with the accompanying drawings.

DESCRIPTION OF THE PREFERRED EMBODIMENTS

The present invention will hereinafter be described in the relation to the prior art with reference to the drawings.

Figure 1:
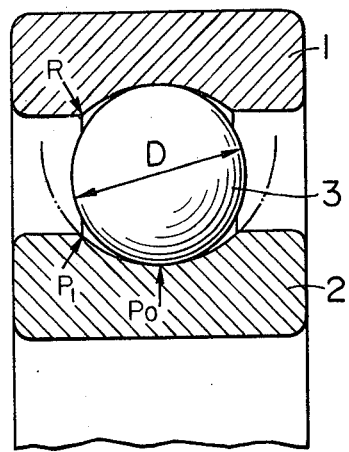
FIG. 1 is an enlarged, axial, fragmentary sectional view of an embodiment of the present invention.
Figure 2:
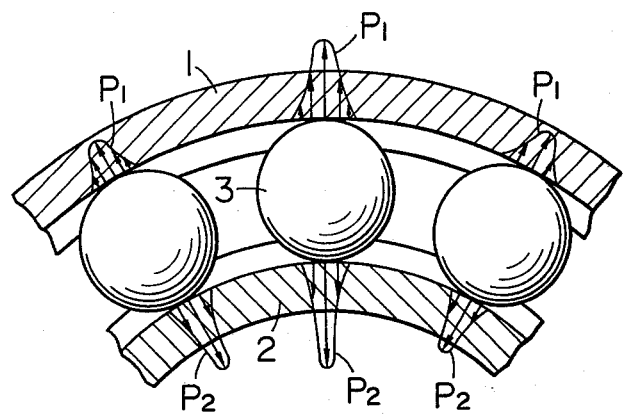
FIG. 2 is a fragmentary cross-sectional view showing the load distribution in the ball bearing according to the prior art.

In the conventional ball bearing, as shown in FIG. 2, the contact between an inner race 2 and balls 3 is such that convexity contacts convexity with respect to the circumferential direction and therefore, the width of the contact ellipse in the circumferential direction thereof becomes narrow and the peak value of the contact stress $P_2$ becomes great. Therefore, in the present invention, the shape of the inner race near the bottom of the groove is made into a form which embraces the balls 3 as closely as possible.

Under such conditions, if the orbit groove coefficient $F_2$ of the inner race is $F_2 > 70$, the riding of the balls onto the orbit groove shoulder of the inner race will be prevented, but the contact surface pressure in the neighborhood of the shoulder will become great and flaking will become liable to occur. On the other hand, if $F_2 < 10$, the contact surface pressure in the neighborhood of the orbit groove shoulder will become small and flaking will be prevented, but the riding of the balls will occur. It is therefore necessary that the orbit groove of the inner race 2 satisfy the following condition:

$$10 \leq F_2 \leq 70 \tag{2}$$

On the other hand, the contact between an outer race and the balls in the conventional ball bearing is such that concavity contacts convexity in the circumferential direction as shown in FIG. 2 and therefore, as compared with the contact between the inner race 2 and te balls 3, the width of the contact ellipse in the circumferential direction thereof becomes wide and the peak value of the contact stress $P_1$ becomes small. Accordingly, reduction in life is not so great even if the shape of the orbit groove of the outer race is one which does not embrace the balls so closely as the race does. Therefore, the orbit groove of the outer race is made into a single circular arc, that is, the curvature radius of the orbit groove of the outer race is constant in cross section. If the groove radius R is 0.52D or more to enhance the ball riding prevention effect particularly, the riding will not occur and the outer race will effectively be balanced with the inner race in respect of the flaking life.

According to the result of the riding test in the wheel bearing of the semi-float type rear axle of an automotive vehicle, in the case of the outer wheel bearing during turning, the riding of the balls onto the groove shoulder occurred for a centrifugal acceleration of 0.6G or higher in the prior art bearing, whereas according to the present invention, the riding of the balls did not occur unless the centrifugal acceleration exceeded 0.8G.

According to the present invention, there is provided a ball bearing which is excellent in the riding prevention effect and has a long life.

Although the present invention has been described with respect to the wheel bearing of the semi-float type rear axle of an automotive vehicle, it is also applicable to a condition in which moment load is particularly great, for example, to the ball bearing in a stirrer wherein the length between the cantilever shaft and the bearing is great and the bend of the shaft is great.

What we claim is:

1. In a ball bearing including an outer race, an inner race and ball-like rolling members interposed between said two races, the improvement residing in that said outer race has a circular arcuate orbit groove and that when the orbit groove coefficient of the inner race is expressed as $$F = \frac{\frac{\rho_1}{D} - 0.5}{\frac{\rho_0}{D} - 0.5}$$

where $\rho_0$ is the curvature radius of the groove bottom of the orbit groove of the inner race, $\rho_1$ is the curvature radius of the groove edge of said orbit groove and D is the diameter of said rolling members, $10 \leq F \leq 70$.

2. A ball bearing according to claim 1, wherein $R \geq 0.52D$ where R is the groove radius of said outer race.

* * * * *